United States Patent
Nugent (10) Patent No.: US 9,609,857 B2
(45) Date of Patent: Apr. 4, 2017

(54) DEVICE AND METHOD FOR PEST CONTROL

(71) Applicant: Todd Nugent, Little Egg Harbor, NJ (US)

(72) Inventor: Todd Nugent, Little Egg Harbor, NJ (US)

(*) Notice: Subject to any disclaimer, the term of this patent is extended or adjusted under 35 U.S.C. 154(b) by 176 days.

(21) Appl. No.: 13/963,671

(22) Filed: Aug. 9, 2013

(65) Prior Publication Data

US 2014/0041284 A1 Feb. 13, 2014

Related U.S. Application Data (60) Provisional application No. 61/681,219, filed on Aug. 9, 2012.

(51) Int. Cl.
*A01M 1/20* (2006.01)
*A01M 1/22* (2006.01)

(52) U.S. Cl.
CPC .................. *A01M 1/2094* (2013.01)

(58) Field of Classification Search
CPC ........ A01M 1/2094; A01M 1/20; A01M 1/00; A01M 1/22; A01M 19/00
USPC ....... 43/123, 124, 132.1, 107, 144; 219/386, 219/387; 190/107
See application file for complete search history.

(56) References Cited

U.S. PATENT DOCUMENTS

| | | | |
|---|---|---|---|
| 3,479,490 A * | 11/1969 | Stark | 219/544 |
| 3,721,803 A * | 3/1973 | DiStefano | 219/387 |
| 3,994,372 A * | 11/1976 | Geller | A47D 15/003 190/107 |
| 4,953,320 A | 9/1990 | Nelson | |
| 5,656,282 A | 8/1997 | Cook et al. | |
| 6,141,901 A * | 11/2000 | Johnson et al. | 43/124 |
| 6,223,870 B1 * | 5/2001 | Godshaw | A45C 7/0077 190/107 |
| 6,279,261 B1 | 8/2001 | Binker et al. | |
| 6,588,140 B1 | 7/2003 | Johnson et al. | |
| 6,594,944 B2 | 7/2003 | Chura | |
| 6,678,994 B2 | 1/2004 | Topp | |
| 7,591,099 B2 | 9/2009 | Lang et al. | |

(Continued)

FOREIGN PATENT DOCUMENTS

EP 0962139 A1 12/1999
RU 2019988 C1 9/1994

(Continued)

OTHER PUBLICATIONS

PCT/2013/054400; International Search Report and Written Opinion; Dec. 19, 2013; 7 pages.

*Primary Examiner* — Darren W Ark
*Assistant Examiner* — Magdalena Topolski
(74) *Attorney, Agent, or Firm* — Gearhart Law LLC (57) ABSTRACT

A device and a method to eradicate pests, specifically bed bugs by applying heat. The device includes a bag having an inner surface made of thermoreflective material. Preferably the walls and the bottom of the bag are double layered and at least one heater is inserted in between the double layers. The infested clothing is inserted into the bag and after closing the bag the heater is turned on for a short period of time to increase the temperature to 150-220 F. Once the temperature has been reached the heater is turned off and a minimum temperature of 150 F is maintained in the bag.

7 Claims, 5 Drawing Sheets

(56) References Cited

U.S. PATENT DOCUMENTS

| | | | |
|---|---|---|---|
| 7,777,157 B2 * | 8/2010 | Jenkins | A45C 15/00 219/227 |
| 7,784,216 B2 | 8/2010 | Kaukeinen et al. | |
| 8,211,419 B2 | 7/2012 | Siljander et al. | |
| 2002/0194773 A1 | 12/2002 | Topp | |
| 2003/0029605 A1 | 2/2003 | Lebrun | |
| 2005/0246942 A1 | 11/2005 | Mueller et al. | |
| 2007/0023980 A1 | 2/2007 | Abaraw | |
| 2007/0084105 A1 | 4/2007 | Lindsay et al. | |
| 2007/0084422 A1 | 4/2007 | Vaughan | |
| 2007/0124987 A1 | 6/2007 | Brown et al. | |
| 2008/0201818 A1 * | 8/2008 | Nilforushan et al. | 2/69 |
| 2008/0264925 A1 * | 10/2008 | Lockhart et al. | 219/387 |
| 2009/0145019 A1 | 6/2009 | Nolen et al. | |
| 2009/0260276 A1 | 10/2009 | Kirsch et al. | |
| 2010/0115826 A1 | 5/2010 | Kerr | |
| 2011/0308139 A1 * | 12/2011 | James | 43/132.1 |
| 2012/0060407 A1 * | 3/2012 | Lindsey | 43/124 |
| 2012/0192479 A1 | 8/2012 | Schmitz | |
| 2014/0090290 A1 * | 4/2014 | Baschnagel, III | 43/123 |
| 2015/0052800 A1 * | 2/2015 | Timbrook et al. | 43/132.1 |

FOREIGN PATENT DOCUMENTS

| | | |
|---|---|---|
| RU | 2074528 C1 | 2/1997 |
| RU | 23745 U1 | 7/2002 |
| RU | 76536 U1 | 9/2008 |
| RU | 2009107034 A | 9/2010 |
| WO | WO 2010096184 A2 | 8/2010 |
| WO | WO 2012037111 A1 | 3/2012 |
| WO | WO2012037111 A1 | 3/2012 |

* cited by examiner

DEVICE AND METHOD FOR PEST CONTROL

PRIORITY

This application claims priority of the provisional application no. U.S. 61/681,219 which was filed on Aug. 9, 2012 and the contents of which is incorporated herein by reference.

FIELD OF THE INVENTION

The invention relates to pest control, specifically extermination of bed bugs. More specifically the invention relates to a device for destroying bed bugs by use of heat.

BACKGROUND OF THE INVENTION

Bedbugs are parasites that feed on human blood. The preferred habitat of bedbugs is areas where people sleep, specifically beds. Bedbugs have been known for thousands of years. They were nearly eradicated in the developed world by 1950's and 1960's but recently they have become an increasingly serious problem, especially in densely populated areas.

Bedbugs are easily spread in clothing, luggage, suitcases and so on as people travel. Recycling of furniture and clothing may also spread bedbugs. There may be bed bugs in movie theaters, in hotel rooms or any place where there are people. Importantly bedbug infestation is not directly related to sanitation level. Bedbugs are very small and therefore difficult to detect. Furthermore, they are active during night time which makes their detection even more difficult.

When a residence or a building is suspected to be infested by bedbugs, usually the bugs are eradicated by use of pesticides, such as pyrethroids, carbamates or malathion. However, pesticides may cause health effects to humans. Therefore, methods not including pesticides are preferred in eradication of bedbugs. Other methods such as blowing hot air into the space may be used.

A special problem arises when an area is wanted to keep clean from bedbugs, but for some reason there is a need to bring infested items, such as clothing or linens to the space. Usually washing and drying the clothing or linens would eradicate the bugs, because bedbugs similarly as many other insects cannot survive temperatures over 120 F. However, there are situations where a washer and dryer are not available, for example when people return clothing or linens to department stores, or in emergency rooms or clinics.

Even if the fact that bedbugs cannot survive temperatures over 120 F (48.8° C.) has been utilized in various methods and devices known in the art, there is still no easy and practical way to treat clothing and linens when for example returned to a department store, or when a person comes into an emergency room.

US patent application 2003/0029605 discloses an improved heat exchange apparatus for insertion in a housing. The apparatus comprises a heating unit outside the house with tubing providing heated steam into the house.

US patent application 2009/0145019 discloses an apparatus comprising a carbon dioxide emission to lure bed bugs and a circuit controlling a heat source to elevate the temperature to kill the lured bedbugs.

US patent application 2007/0084105 discloses a mobile system including heating units for providing heated air, the mobile system being transported to desired location and connected with a duct to a structure where the pests are to be destroyed U.S. Pat. No. 6,588,140 discloses an enclosure made of heat resistant flexible material where heated outside air is introduced into the enclosure to provide lethal temperature inside the enclosure U.S. Pat. No. 6,141,901 discloses a method to pest extermination by determining air flow parameters in an area and introducing heated air to the area with prerequisite flow rate and initial temperature U.S. Pat. No. 4,953,320 discloses a trap for cockroaches including a heating element providing a temperature that attracts the pests and then periodically providing a higher heat to kill the pests.

U.S. Pat. No. 6,678,994 discloses a method to eradicate pest by circulating heated air from bulk products after specifying the heating requirements based on product density, weight and volume.

International patent application publication WO2012/037111 discloses a portable heat chamber made of panels and including at least one heater and at least one fan to increase the temperature inside the chamber.

The bedbug problem is rapidly spreading not only in the big cities but everywhere in this and other countries. Accordingly, there is an urgent need for novel devices and methods to eradicate bedbugs. Specifically there is a need for a simple and easy to use device.

Embodiments of this invention are illustrated in the accompanying drawings and will be described in more details below.

SUMMARY OF THE INVENTION

The invention of the present disclosure is distinguished over the prior art in general and particularly the instant disclosure solves the above flaws of the prior art.

The invention according to this disclosure provides a case, a bag or a container for exterminating bedbugs habiting in cloths or other items. One preferred embodiment of the invention provides a device and a method to exterminate bedbugs from small items, such as clothing. Another preferred embodiment provides a device and a method to exterminate bedbugs from larger items, such as mattresses. Both of the embodiments are portable and easy to use and manufacture.

According to one preferred embodiment, a case is made of insulating material lined with heat reflecting material. The case may be enclosed in a bag. The case has four walls, a bottom and optionally a detachable lid. When the case is inside a bag, an insulated top of the bag may be used as a lid of the case. A heater is locating at the bottom of the case, and there may be a tray locating on top of the heater. The heater is preferably an electric or infrared heater. The clothes or other infested items are inserted on top of the tray. At least one thermometer is inserted inside the case; one of the thermometers may be in middle of the clothes or items loaded into the case. The open top is closed with a lid or by closing the insulated top of the bag. The heater is so selected that it heats the inside of the case to about 120-220 F, preferably to about 150-200 degrees Fahrenheit. The temperature is reached within a few minutes and once the temperature is reached the heater is turned off. A minimum temperature of 150 F is maintained in the case for at least an hour by the insulation and reflecting lining. After about an hour the case can be opened and the clothes or items removed as the bedbugs are killed.

According to one preferred embodiment the device is a preferably collapsible bag having a bottom, four walls and a lid. At least one of the four walls comprise of a double layer thermoreflecting material. Preferably, all walls comprise double layer of thermoreflective material. Optionally the bottom and the lid comprise also a double layer reflecting material. There is at least one a heating element between each double layer reflecting wall. A heating element is also between the double layered bottom and optionally also between the double layered lid. The heating elements are preferably electric, but they may also be infrared, induction or other type of heaters. In one preferred embodiment the heating elements are attached to reflective boards that are inserted in between the two layered walls, bottom and/or lid. The heating elements are so connected that an electric outlet is located outside the bag. The outlet can be connected to power source with a power cord, for example AC or DC electric outlet. The electric outlet may be a wall outlet or an electric outlet in a car. The clothes are packed into the bag, the lid is closed and the electric cord is plugged into an outlet. The heating elements raise the temperature to at least 150 F for at least an hour. The system may include an automatic switching off the heating after certain period of time or after certain temperature has been maintained for determined period of time. According to one preferred embodiment the device has a display showing the temperature and optionally the time period of the heating.

The invention according to this embodiment is easy and practical to use in places where there are no dryers to use to heat clothes to temperatures that kill bedbugs. One likely user for this embodiment would be department stores when they receive returned clothing items, such as sheets or bed covers. Another likely user is emergency rooms, dialysis facilities and other similar places. The device may also be used for example by enterprises renting costumes.

Another embodiment according to this invention is designed for use with larger objects, such as mattresses. This embodiment comprises of a container, such as a trailer, the inside surface of which is lined with fiber glass mesh or blanket. The infested mattresses or other items are carried into the trailer where heated air is blown to raise the temperature to 120-220 F, preferably to 150 F. An electric or infrared heater may also be used. This embodiment is practical to treat mattresses for example when they are returned to a department store or in thrift stores before carrying used mattresses inside the facilities.

It is an object of this invention to provide a device for treating pests with elevated temperature, said device comprising a bag having a bottom, four walls and a top; said bottom and said walls comprising two layers of reflecting material;
a heating element locating in between of each two layered wall and bottom;
a connection of said heating elements to an electric outlet outside the bag, said outlet being capable to be connected to an AC or DC power source; wherein upon closing the insulated top of the bag, the electric heaters are capable of heating the inside of the bag to 150-220 F and the reflecting material maintaining the temperature at about 150 F for at least one hour and the temperature inside the bag can be monitored via an thermometer having a display outside the bag.

It is an object of this invention to provide a device for treating pests with elevated temperature, said device comprising: a bag having an insulated top; a case inserted inside the bag, said case being made of insulating material and comprising four side walls, a bottom, an inner surface, and an outer surface; a reflecting lining covering the inner surface of the case; a heating element on the bottom of the case; a tray on top of the heating element; and at least one thermometer; wherein upon closing the insulated top of the bag, the electric heater is capable of heating the inside of the case to 150-220 F and the insulating material and the reflecting lining enable maintaining the temperature at about 150 F for at least one hour and the temperature inside the case can be monitored via the at least one thermometer.

DESCRIPTION OF THE PREFERRED EMBODIMENTS

The preferred embodiments of the present invention will now be described with reference to FIGS. 1-8 and identical elements in the various figures are identified with the same reference numerals.

Figure 1:
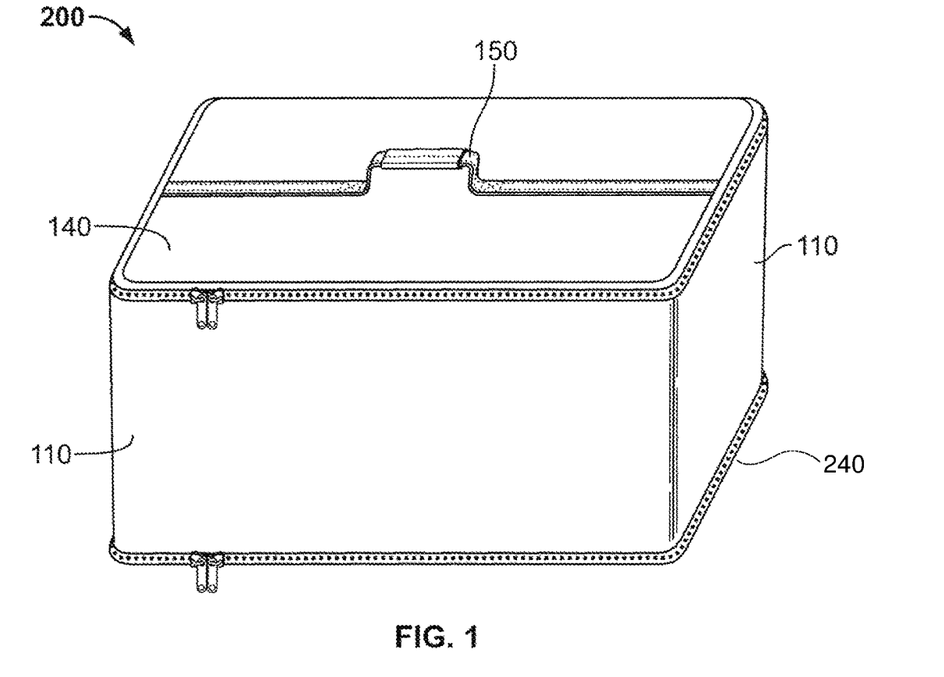
FIG. 1 is a perspective view of one preferred embodiment of the invention.

FIG. 1 shows a perspective view of a preferred embodiment. The figure shows the bag 200, the side walls 110, the lid 140 and the handle 150.

Figure 2:
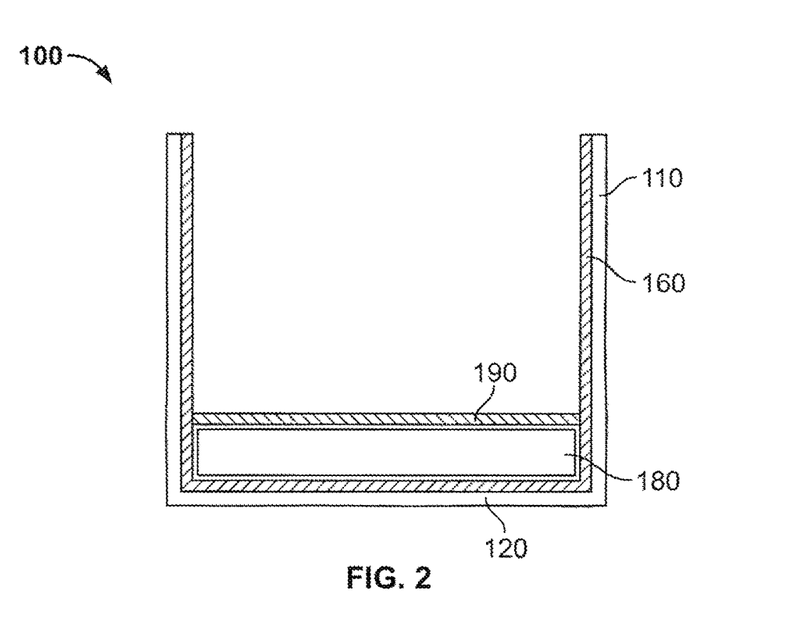
FIG. 2. is a cross sectional view of an alternative embodiment of the invention shown without a lid.

FIG. 2 shows a cross sectional view of the case 100 of FIG. 1 without the lid. The figure shows the side walls 110, the bottom 120, the heat reflecting liner 160, the heater 180 and the tray 190. According to one preferred embodiment the tray 190 may be reflective liner.

Figure 3:
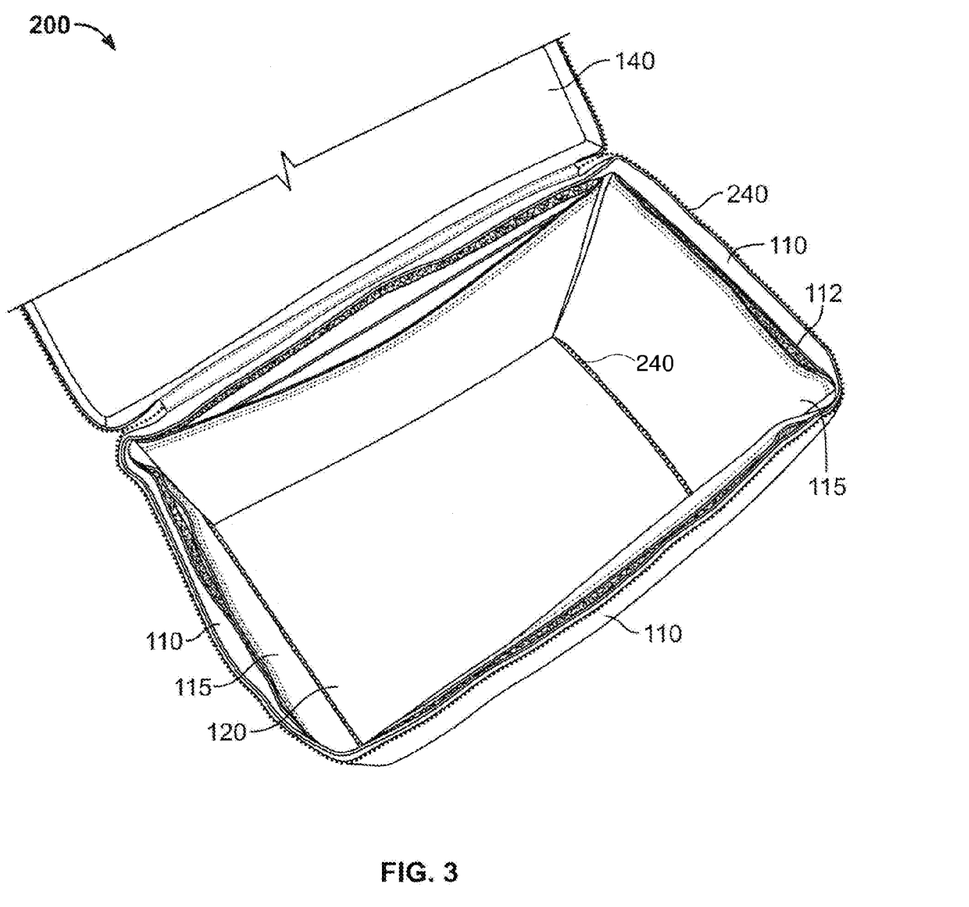
FIG. 3. is a top view of one preferred embodiment of the invention.

FIG. 3 shows a top view of another preferred embodiment. The figure shows the bag 200, the side walls formed of two layers 110 and 115, the bottom 120, the lid 140 and strips 112 to attach the two layers 110 and 115 together. The strips may be hook-loop type of strips.

Figure 4:
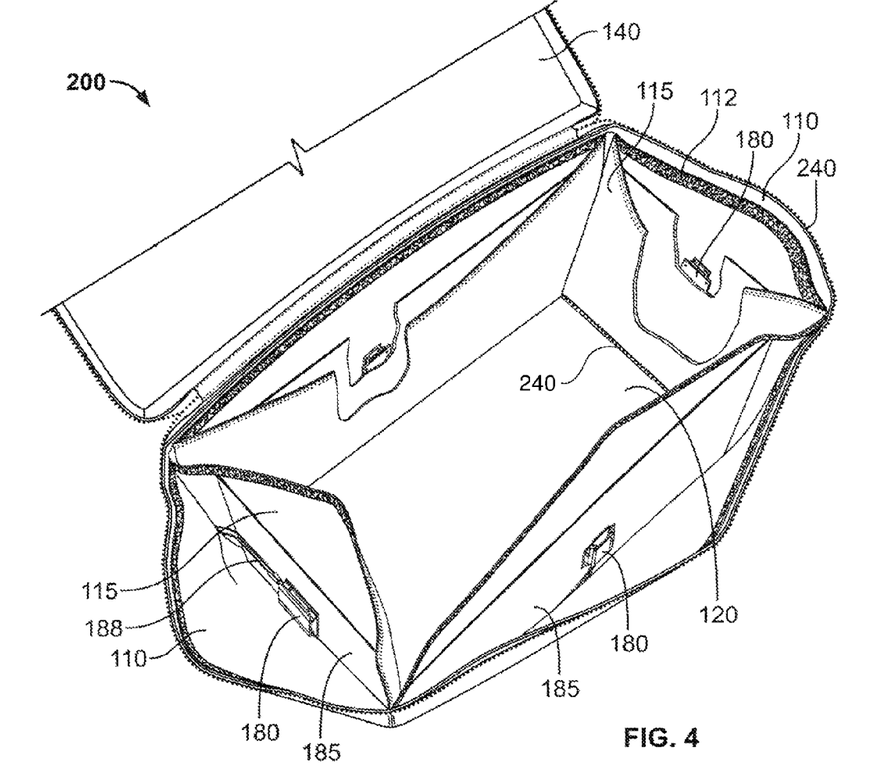
FIG. 4 is a top view of the preferred embodiment of FIG. 3 showing the heating elements in between of the double layered walls.

FIG. 4 shows another top view of the bag 200. The figure shows the bag 200, the lid 140, the bottom 120, the walls formed of two layers 110 and 115, the attaching strips 112, the heating elements 180 attached to the reflective boards 185 and the wires 188.

Figure 5:
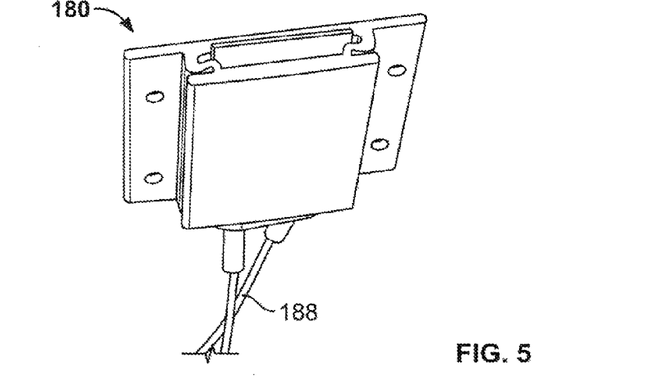
FIG. 5 is a perspective view of the heating element with connecting wires.

FIG. 5 shows a heating element 180 with the wires 188. The heating element may be attached to a reflective board (not shown in this figure).

Figure 6:
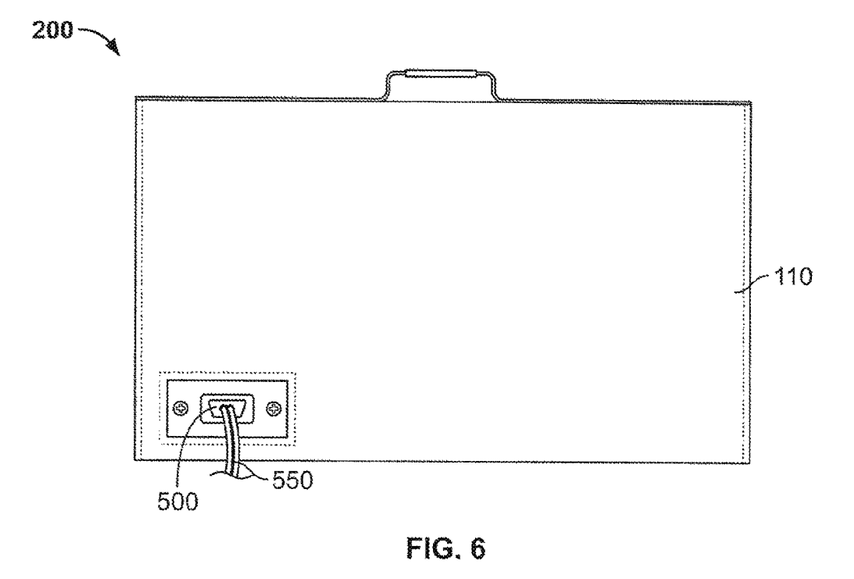
FIG. 6. is a rear view of one preferred embodiment showing the electric outlet outside the device.

FIG. 6 shows a rear view of the bag 200. The figure shows a wall 110 and an electric outlet 500 and a cord 510 connecting the heating elements to a power source.

Figure 7:
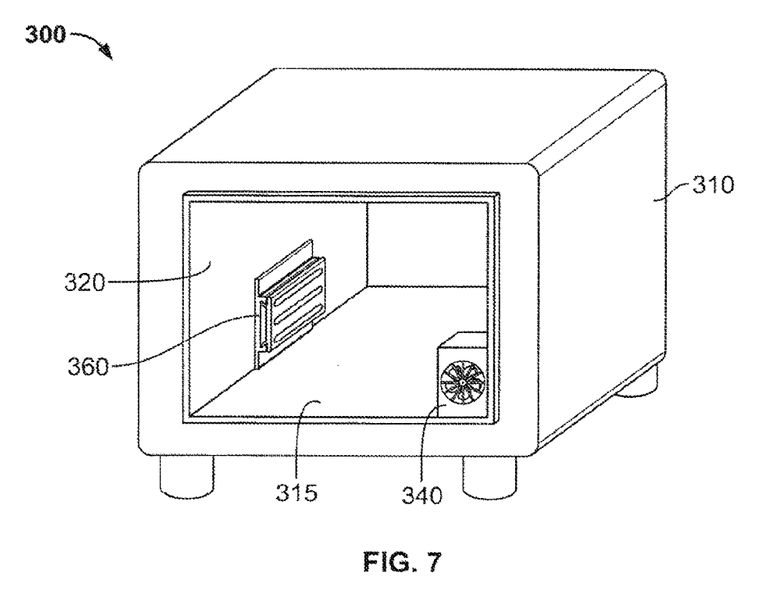
FIG. 7 is a perspective view of another embodiment of the invention where the device is container such as a trailer or a truck, for treating large items.

FIG. 7 is an illustration of another embodiment of the invention. The figure shows a container 300, the side walls 310, the floor 315, the fiber glass lining 320, a blow air heater 340 and electric heater 360. Both the electric heater and the blow air heater are shown in the container, but preferably only one of these heaters is used.

Figure 8:
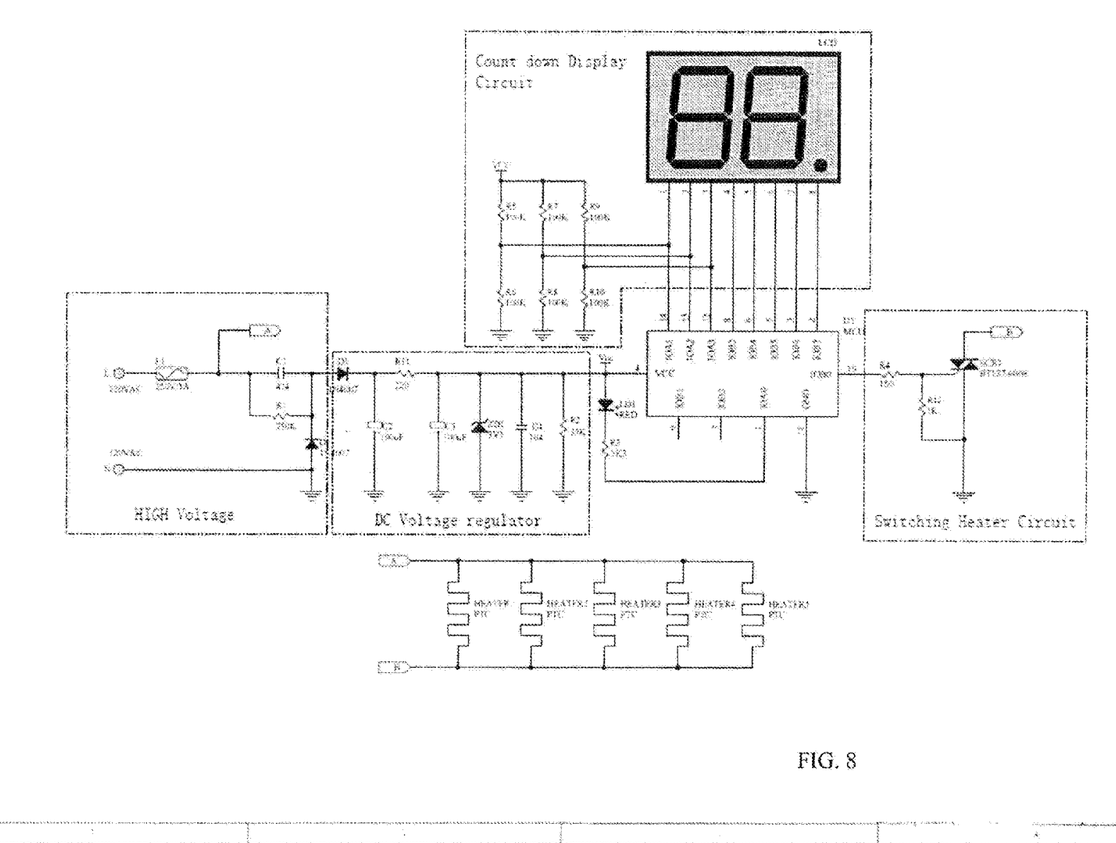
FIG. 8. A schematic diagram of the circuitry in a device shown in FIGS. 3 and 4.

FIG. 8 is a schematic diagram of the circuitry of the heaters in a bag where there is one heater in between of each double layered wall and one in between a double layered bottom.

The present invention is now further described by way of example only with reference to accompanying drawings.

Referring now to FIGS. 1, 3 and 4, according to one preferred embodiment the device of this invention is a bag 200. With referral to FIG. 2, the device may be a case 100 that may then be inserted into a bag.

Referring now to FIG. 2 according to one preferred embodiment the device according to this invention comprises a case 100 having four walls 110, and a bottom 120. The case 100 may be inserted in a bag having a lid (not shown in FIG. 2). The walls, and the bottom are preferably made of insulating material, such as but not limited to foam, more specifically polyurethane foam or polystyrene foam, but any other thermo-insulating material may be used as well.

As is illustrated in FIG. 2, the inner surface of the case is lined with a reflective liner 160. The liner may be foil, but any other thermo-reflective material may also be used.

A heater 180 is inserted in to the case 100 as is shown in FIG. 2. The heater may be an electric heater or an infrared heater. Any other type of heater may also be used. The heater may be battery operated or it may be connected to an outlet with an electric cord 510 (shown in FIG. 6). Once the heater is turned on it is capable of heating the inner space of the case to 150-220 F within a few minutes.

According to the embodiment of FIG. 2 on top of the heater 180 there is a tray 190. The tray may be made of reflective liner or it may be made of aluminum, but other heat conducting materials may also be used.

The infested items are loaded on the tray. At least one thermometer may be inserted in between the infested items. If the case is inserted in a bag the bag is closed or otherwise a lid is provided to the case. If the heater has an electric cord 510, the cord may be pulled between the lid 140 and the case wall 110, or there is an inlet on one of the walls for the cord (as shown in FIG. 6).

The heater is turned on for about five minutes, during which time the temperature is recorded via the thermometer inside the case. Once the desired temperature between 150 and 220 F is reached the heater is turned off. The insulating material and the reflective material of the lining together maintain the temperature at about 150 F for at least an hour. Once the case is opened after the period of one hour, the bedbugs are killed. The temperature may be kept anywhere between 120-220 F, but a temperature about 150 F is most cost effective. Temperature of 120 F is known to be lethal for bed bugs, but keeping the temperature strictly at 120 F may leave some bedbugs alive as the temperature may not be high enough for example inside the seams of the clothes.

According to one preferred embodiment the case may additionally contain at least one container filled with heat storing material, such as heat storing fluids or gels. The container may be a bag- or pillow-like container.

Now referring to FIGS. 1, and 3-6, according to another embodiment, the device comprises a bag 200. The bag may be made of nylon, but it may be made of any other feasible material as well. The bag may be collapsible such that it can be stored in small space when not used. One preferred way to make the bag collapsible is to have each of the walls (110, 115) attached to each other with zippers, or attaching the bottom 120 to the walls 110, 115 with zippers. The bag 200 has a lid 140 which may be insulated. The inner surface of the lid is reflective material. The bag may be opened and closed with one or more closing means 240. Such closing means may be zippers, hook-and-loop fasteners or any other closing means. A zipper is a preferred means. The closing means 240 may locate on the top of the bag as shown in the figures, but the closing means may as well locate on the side or at the ends of the bag. According to a preferred embodiment the dimensions of the bag are 12×20×10 inches (30.48×50.80 cm ×25 cm), however any feasible dimensions may be used.

As is shown in FIGS. 3 and 4, the bag has double layered walls comprising an inner layer 115 and an outer layer 110. The inner layer and the outer layer are made of thermoreflective material and the layers can be attached together with an attachment strip 112. The attachment strip preferably locates at the upper ends of the layers and is made of hoop loop material, such as Velcro®. The outer and inner layers made of thermoreflective material have the reflective surface at least on their inner sides. Such thermorefelctive material may be thermoreflective fabric. The bag has a bottom 120 which is made of thermoreflective material. Most preferably the bottom 120 is also double layered. Heaters 180 locate in between of the double layered walls and the double layered bottom. The lid may also be double layered and there may additionally be a heater in between the two layers of the lid. The heaters 180 are preferably electric heaters, but infra red, induction or any other feasible type of heaters may also be used. The heaters 180 are preferably attached to a reflective board 185. The boards are flat and conveniently insertable between the outer and the inner layers of the walls, the bottom and optimally of the lid.

The infested items are loaded inside the bag. The bag is closed with the closing means 240. A thermometer may be separately inserted into the bag. Preferably there is a display outside the bag to follow the temperature. Alternatively there may be thermo sensors in the heating elements that are measuring the temperature and a display may be outside the bag. The heater is turned on for about five minutes to increase the temperature in the case to 150-220 F. Once the desired temperature is reached the heater is turned off and the insulating material and the reflective liner maintain the temperature of about 150 F for about an hour, during which time the bedbugs are killed. There may be an automatic switch to turn the heaters off after certain time period or after certain temperature has been maintained for desired time.

The bag may contain insulating material and such material may be insulating foam, such as polyurethane foam or polystyrene foam, but other insulating materials may also be used. The bag may additionally contain at least one bag or pillow filled with heat storing material, such as heat storing fluids or gels.

The heater 180 is preferably an electric, an infrared or an induction heater. The heater may be battery operated but it may also have an electric cord 510. Preferably there are five electric heaters in the bag: one between each double layered wall and one between the double layered bottom. The heaters 180 are wired with wires 188 that are connected to an outlet 500 outside the bag as is shown in FIG. 6. The heaters may be connected via an electric cord 510 to an AC or DC outlet, for example on the wall or to a cigarette lighter in a car.

Now referring to FIG. 7, the device according to this invention may also be a container 300, such as a trailer. The walls (sidewalls 310 and a doorway wall which is not shown in the figure), the floor 315 and the ceiling f the container are lined with fiber glass mesh or blanket 320 to insulate the container. The container encloses a heater, which may be a blow air heater 340 (schematically shown) or an as electric or infrared heater 360 (shown in same figure). A preferred embodiment has only a blow air heater. Another preferred embodiment has an electric or an infrared heater. Infested material, for example mattresses are carried into the container. The container is closed and the temperature is raised to 150-220 F for one hour by means of the heater. The heater may be turned on for a short period of time, or it may be regulated with a thermostat. After about an hour the treated material can be safely carried out as the bed bugs have been killed.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A bag for treating pests with elevated temperature, said bag comprising:
    a bottom;
    four walls; and
    a lid;
        wherein at least one of the walls comprises an inner layer and an outer layer, and both of the layers having thermoreflective inner surfaces, and at least one heating element located in between the inner and outer layers;
        wherein, upon closing the bag with the lid, the at least one heating element is capable of heating the inside of the bag to 150-220 F, with a minimum temperature of about 150 F, for at least one hour, and wherein the inside temperature can be monitored via at least one thermometer;
        wherein the at least one heating element is an electric heater and they are wired to be connected to a power source outside the bag and are attached to a reflective board that is inserted in between the inner and outer layers; and
        wherein the outer layer and the inner layer of the at least one wall can be attached to each other with an attachment strip.

2. The bag of claim 1, wherein each of the four walls and the bottom comprise the inner layer and outer layer, and each of the layers have a thermoreflective inner surface, and the at least one heating element is located between the inner and outer layers of the respective four walls and the bottom.

3. The bag of claim 1, wherein the at least one heating element have a switch to turn them off after a selected time period or after temperature has been maintained at a selected level for a selected period of time.

4. The bag of claim 1, wherein the bag is collapsible and includes a first closing mechanism for connecting three of the four walls and the lid, and a second closing mechanism for connecting the three walls and the bottom.

5. The bag of claim 1, wherein the at least one heating element is turned on to heat the inside of the bag to 200 F, and is capable of maintaining a minimum temperature of 150 F for at least one hour.

6. The bag of claim 1, wherein the at least one heating element is turned automatically off when the temperature has been at a minimum of 150 F for an hour.

7. The bag of claim 1, wherein the pests are bed bugs.

* * * * *